(12) United States Patent
Cui et al.

(10) Patent No.: US 12,158,340 B2
(45) Date of Patent: Dec. 3, 2024

(54) DEVICE AND METHOD FOR MEASURING LASER DISPLACEMENT

(71) Applicant: National Institute of Metrology, Beijing (CN)

(72) Inventors: Jianjun Cui, Beijing (CN); Peng Zhang, Beijing (CN); Kai Chen, Beijing (CN)

(73) Assignee: National Institute of Metrology, China, Beijing (CN)

( * ) Notice: Subject to any disclaimer, the term of this patent is extended or adjusted under 35 U.S.C. 154(b) by 207 days.

(21) Appl. No.: 17/973,391

(22) Filed: Oct. 25, 2022

(65) Prior Publication Data

US 2023/0047877 A1 Feb. 16, 2023

Related U.S. Application Data

(63) Continuation of application No. PCT/CN2022/087921, filed on Apr. 20, 2022.

(30) Foreign Application Priority Data

Aug. 10, 2021 (CN) .......................... 202110910775.2

(51) Int. Cl.
*G01B 9/02001* (2022.01)
(52) U.S. Cl.
CPC ...... *G01B 9/02007* (2013.01); *G01B 2290/25* (2013.01)
(58) Field of Classification Search
CPC .................. G01B 2290/25; G01B 9/02007
See application file for complete search history.

(56) References Cited

U.S. PATENT DOCUMENTS

| 4,225,236 A | 9/1980 | Sandercock |
| 4,558,952 A | 12/1985 | Kulesh et al. |
| 2007/0002327 A1 | 1/2007 | Zhou et al. |

FOREIGN PATENT DOCUMENTS

| CN | 102288103 A | 12/2011 |
| CN | 102494617 A | 6/2012 |

(Continued)

OTHER PUBLICATIONS

J. Militky, "Highly sensitive displacement measurement based on spectral interferometry and Vernier effect", 2016 (Year: 2016).*

(Continued)

*Primary Examiner* — Maurice C Smith
(74) *Attorney, Agent, or Firm* — Westbridge IP LLC

(57) ABSTRACT

Disclosed are a device and a method for measuring laser displacement. The device comprises an interferometric measurement module, a laser light source module, a signal modulation module, a control processing module and an optical vernier demodulation module. The control processing module controls the signal modulation module to apply a light source modulation signal to the laser light source module, so that the laser light source module provides two laser beams with fixed frequency difference to the interferometric measurement module. The control processing module controls the interferometric measurement module to perform interferometric measurement. During measurement, lasers respectively interfere in two Fabry-Perot cavities in the interferometric measurement module, and are detected by two photodetectors to form main and secondary measurement interference signals. The optical vernier demodulation module demodulates the main and secondary measurement interference signals obtained by the interferometric measurement module.

9 Claims, 6 Drawing Sheets

(56) References Cited

FOREIGN PATENT DOCUMENTS

| | | |
|---|---|---|
| CN | 102654422 A | 9/2012 |
| CN | 202533042 U | 11/2012 |
| CN | 107560555 A | 1/2018 |
| CN | 107860405 A | 3/2018 |
| CN | 110017793 A | 7/2019 |
| CN | 110057307 A | 7/2019 |
| CN | 110118532 A | 8/2019 |
| CN | 110319769 A | 10/2019 |
| CN | 110319786 A | 10/2019 |
| CN | 113030547 A | 6/2021 |
| CN | 113358037 A | 9/2021 |
| CN | 113607691 A | 11/2021 |
| GB | 2055193 A | 2/1981 |
| JP | S59178303 A | 10/1984 |
| WO | 2008093448 A1 | 8/2008 |

OTHER PUBLICATIONS

Boyi Song, "Liquid-crystal based Fabry—Perot interferometer displacement sensor", 2018 (Year: 2018).*
First Office Action issued in counterpart Chinese Patent Application No. 202110910775.2, dated Sep. 23, 2021.

\* cited by examiner

DEVICE AND METHOD FOR MEASURING LASER DISPLACEMENT

CROSS-REFERENCE TO RELATED APPLICATIONS

This application is a continuation of International Application No. PCT/CN2022/087921 filed on Apr. 20, 2022, which claims priority to Chinese Patent Application No. 202110910775.2, filed on Aug. 10, 2021. The disclosures of the above-mentioned applications are hereby incorporated by reference in their entireties.

TECHNICAL FIELD

The application belongs to the technical field of precision measurement, and in particular to a device and a method for measuring laser displacement based on optical vernier Fabry-Perot interferometry.

BACKGROUND

High-precision nanometer displacement measurement has important applications in ultra-precision machining, microelectronic manufacturing, precision measurement and other technical fields. Laser interferometer is one of the most precise measuring instruments in the field of measurement, taking the wavelength of light as a measurement scale, and it has the capability of ultra-high resolution measurement. It has been widely used in the field of modern industrial measurement. However, both single-frequency laser interferometers and dual-frequency laser interferometers have periodic nonlinear errors, which can reach several nanometers or even tens of nanometers, seriously affecting an improvement of the accuracy of laser interferometers. At the same time, due to influences of interference laser wavelength and optical structure, a resolution or measurement range of laser interferometric measurement will be limited to a certain extent, so it is impossible to give consideration to both.

SUMMARY

Aiming at the shortcomings in the prior art, the application aims to provide a device and a method for measuring laser displacement, and simultaneously construct two sets of Fabry-Perot interferometers to coordinate with each other to form a main measurement interference signal and a secondary measurement interference signal, and realize large-range sub-picometer resolution dynamic displacement measurement by demodulating out a magnitude of displacement measurement through optical vernier principle.

To achieve the above objective, the application adopts the following technical scheme.

A device for measuring laser displacement includes an interferometric measurement module, a laser light source module, a signal modulation module, a control processing module and an optical vernier demodulation module. The control processing module controls the signal modulation module to apply a light source modulation signal to the laser light source module, so that the laser light source module provides two laser beams with fixed frequency difference to the interferometric measurement module. The control module controls the interferometric measurement module to perform interferometric measurement. During measurement, lasers respectively interfere in two Fabry-Perot cavities in the interferometric measurement module, and are detected by two photodetectors to form a main measurement interference signal and a secondary measurement interference signal. The optical vernier demodulation module demodulates the main measurement interference signal and the secondary measurement interference signal obtained by the interferometric measurement module, and demodulation results are calculated by the control processing module to obtain a measured displacement.

Optionally, the interferometric measurement module includes a first photodetector, a second photodetector, a first precision displacement stage, a first resonant plane mirror, a second resonant plane mirror, a first pyramid reflector and a second precision displacement stage. The laser light source module emits a main laser beam and a secondary laser beam. The main laser beam is injected into a first Fabry-Perot cavity composed of the first resonant plane mirror fixed on the first precision displacement stage and the first pyramid reflector fixed on the second precision displacement stage, and interferes to form a main measurement interference beam. The main measurement interference beam is received by the first photodetector to form the main measurement interference signal. The secondary laser beam is injected into a second Fabry-Perot cavity composed of the second resonant plane mirror and the first pyramid reflector, and interferes to form a secondary measurement interference beam. The secondary measurement interference beam is received by the second photodetector to form the secondary measurement interference signal.

Optionally, the interferometric measurement module comprises a first photodetector, a second photodetector, a first precision displacement stage, a second resonant plane mirror, a first pyramid reflector, a second precision displacement stage, a second pyramid reflector, a third resonant plane mirror, a reflector, a beam splitting plate, a third photodetector and a beam splitter mirror. The laser light source module emits a main laser beam and a secondary laser beam with fixed frequency difference. The main laser beam is divided into a first sub-main laser beam and a second sub-main laser beam by the beam splitting plate. The first sub-main laser beam is reflected into a first Fabry-Perot cavity composed of a third resonant plane mirror fixed on a first precision displacement stage and the first pyramid reflector fixed on the second precision displacement stage, and interferes to form a first sub-main measurement interference beam. The first sub-main measurement interference beam is transmitted through the beam splitter mirror and received by the first photodetector to form a first sub-main measurement interference signal. The second sub-main laser beam is reflected into a second Fabry-Perot cavity composed of the third resonant plane mirror and the second pyramid reflector, and interferes to form a second sub-main measurement interference beam. The second sub-main measurement interference beam is reflected by the beam splitter mirror and received by the third photodetector to form a second sub-main measurement interference signal. The first sub-main measurement interference signal and the second sub-main measurement interference signal form the main measurement interference signal. The secondary laser beam is reflected by the reflector into a third Fabry-Perot cavity composed of the second resonant plane mirror and the first pyramid reflector and interferes to form the secondary measurement interference beam, and the secondary measurement interference beam is received by the second photodetector to form the secondary measurement interference signal.

Optionally, the first resonant plane mirror is a plane mirror with first reflectivity at both ends, and the first reflectivity is 2.5%-97.6%. The second resonant plane mirror is a plane mirror with total transmission in a middle and second reflectivity at both ends, and the second reflectivity is 2.5%-97.6%.

Optionally, the second resonant plane mirror is a plane mirror with total transmission in a middle and second reflectivity at both ends, and the second reflectivity is 2.5%-97.6%. The third resonant plane mirror is a plane mirror with third reflectivity in a middle and fourth reflectivity at both ends, wherein the third reflectivity is 90%-97.6% and the fourth reflectivity is 2.5%-97.6%.

The application also provides a method for measuring laser displacement, including:

S11, modulating a laser light source module by a signal modulation module, so that two laser beams with wavelengths of $\lambda$, $\lambda_0$ respectively, are emitted by the laser light source module, and injected into an interferometric measurement module for interferometric measurement;

S12, controlling the interferometric measurement module to perform interferometric measurement by a control processing module; injecting lasers with wavelengths of $\lambda$, $\lambda_0$ into a main Fabry-Perot interferometer composed of a first precision displacement stage, a first resonant plane mirror, a first pyramid reflector and a second precision displacement stage, and a secondary Fabry-Perot interferometer composed of a second resonant plane mirror, the first pyramid reflector and the second precision displacement stage, respectively, for interference to form a main measurement interference beam and a secondary measurement interference beam, then receiving the main measurement interference beam and the secondary measurement interference beam by a first photodetector and a second photodetector respectively;

S13, controlling the second precision displacement stage to move by the control processing module, so that the first pyramid reflector scans back and forth;

S14, detecting the main measurement interference beam by the first photodetector to obtain a main measurement interference signal when a displacement of the first resonant plane mirror is $\Delta L$; detecting the secondary measurement interference beam by the second photodetector to obtain a secondary measurement interference signal; demodulating the main measurement interference signal and the secondary measurement interference signal by an optical vernier demodulation module through an optical vernier principle, demodulating out the number of M of small displacements, and calculating small displacements l by the control processing module:

$$l = M \times \frac{\lambda - \lambda_0}{4};$$

S15, demodulating out the number N of large displacements by the optical vernier demodulation module when a displacement of the second resonant plane mirror exceeds a Fabry-Perot interference peak, in other words, the second resonant plane mirror moves more than one large displacement, and calculating large displacements L by the control processing module:

$$L = N \times \frac{\lambda}{4};$$

and

S16, calculating the large displacements and the small displacements by the control processing module and then calculating a measured displacement $\Delta L$ according to following formula, $$\Delta L = L + l,$$

so far, obtaining a motion displacement of the first resonant plane mirror.

Optionally, the first resonant plane mirror is a plane mirror with first reflectivity at both ends, and the first reflectivity is 2.5%-97.6%. The second resonant plane mirror is a plane mirror with total transmission in a middle and second reflectivity at both ends, and the second reflectivity is 2.5%-97.6%.

The application also provides a method for measuring laser displacement, including:

S21, modulating a laser light source module by a signal modulation module, so that two laser beams with wavelengths of $\lambda$, $\lambda_0$ respectively, are emitted by the laser light source module, and are injected into an interferometric measurement module for interferometric measurement;

S22, controlling an interferometric measurement module to perform interferometric measurement by a control processing module; dividing a laser with wavelength of $\lambda$ into a first sub-main laser beam and a second sub-main laser beam by a beam splitting plate, and injecting the first sub-main laser beam, the second sub-main laser beam and the laser with wavelength of $\lambda_0$ respectively to a first main Fabry-Perot interferometer composed of a first precision displacement stage, a third resonant plane mirror, a first pyramid reflector and a second precision displacement stage, a second main Fabry-Perot interferometer composed of the first precision displacement stage, a third resonant plane mirror and a second pyramid reflector and a secondary Fabry-Perot interferometer composed of the second resonant plane mirror, the first pyramid reflector and the second precision displacement stage for interference to form a first sub-main measurement interference beam, a second sub-main measurement interference beam and a secondary measurement interference beam, then receiving the first sub-main measurement interference beam, the second sub-main measurement interference beam and the secondary measurement interference beam by a first photodetector, a second photodetector and a third photodetector respectively;

S23, controlling the second precision displacement stage to move by the control processing module, so that the first pyramid reflector scans back and forth;

S24, detecting the first sub-main measurement interference beam by the first photodetector to obtain a first sub-main measurement interference signal when a displacement of the third resonant plane mirror is $\Delta L$; detecting the secondary measurement interference beam by the second photodetector to obtain a secondary measurement interference signal; detecting the second sub-main measurement interference beam by the third photodetector to obtain a second sub-main measurement interference signal;

S25, demodulating the first sub-main measurement interference signal and the secondary measurement interference signal by an optical vernier demodulation module according to an optical vernier principle, demodulating out the number M of small displacements, and calculating small displacements l by the control processing module:

$$l = M \times \frac{\lambda - \lambda_0}{4};$$

S26, demodulating the second sub-main measurement interference signal to obtain the number of large displacements by the optical vernier demodulation module, and calculating by the control processing module to obtain large displacements L:

$$L = N \times \frac{\lambda}{4};$$

and

S27, calculating the large displacements and the small displacements by the control processing module, and then calculating a measured displacement ΔL according to following formula, $$\Delta L = L + l + l_0;$$

so far, the motion displacement of the third resonant plane mirror is obtained, where $l_0$ is a difference of light intensity peak displacement between the first sub-main measurement interference signal and the second sub-main measurement interference signal when a mechanical setting is zero.

Optionally, the second resonant plane mirror is a plane mirror with total transmission in a middle and second reflectivity at both ends, and the second reflectivity is 2.5%-97.6%; the third resonant plane mirror is a plane mirror with third reflectivity in a middle and fourth reflectivity at both ends, wherein the third reflectivity is 90%-97.6% and the fourth reflectivity is 2.5%-97.6%.

The application has following beneficial effects.

Firstly, by measuring a wavelength difference between the main measurement laser beam and the secondary measurement laser beam, the application adopts the optical vernier principle to analyze the displacement, so that the displacement measurement of sub-picometer resolution is realized.

Secondly, the Fabry-Perot interferometer adopted by the application realizes the measurement of displacement by combining magnitude of displacement, overcoming a problems that the Fabry-Perot cavities cannot meet the requirement of long-distance interferometric measurement.

Lastly, the double-frequency double-Fabry-Perot cavity structure adopted by the application has strong anti-interference ability and can realize long-distance and high-precision measurement.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labor.

DETAILED DESCRIPTION OF THE EMBODIMENTS

The technical schemes in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative efforts are within the scope of the present application.

In order to make the above objectives, features and advantages of the present application more obvious and understandable, the present application will be explained in further detail below with reference to the drawings and detailed embodiments.

Embodiment 1

Vernier effect is first applied to improve a resolution of length measurement (such as vernier caliper), and a working principle vernier effect is to skillfully use a tiny scale difference between a main ruler and vernier to measure length. A principle of optical vernier is an application of vernier effect in optical interference. When two lasers with wavelength differences perform Fabry-Perot interference, two interference signals with slight differences are formed, which is similar to the main ruler and vernier of vernier caliper. By demodulating these two interference signals, a displacement reading of sub-picometer resolution is obtained by passing through the optical vernier and the optical main ruler. Laser wavelength measuring device and method using Fabry-Perot interference technology is adopted, where Fabry-Perot interference is multi-beam interference. According to the formula of multi-beam interference:

$$I = \frac{a^2}{1 + \frac{4R}{(1-R)^2}\sin^2\left(\frac{2\pi d}{\lambda}\right)}, \quad (1)$$

where I is transmitted light intensity, a is incident light amplitude, R is light intensity reflectivity of Fabry-Perot cavity resonator, d is a cavity length of Fabry-Perot cavity, and λ is incident light wavelength. A relationship between an interference peak interval Δd and an interference wavelength λ of a folded Fabry-Perot cavity is expressed as:

$$\Delta d = \frac{\lambda}{4}. \quad (1)$$

Figure 4:
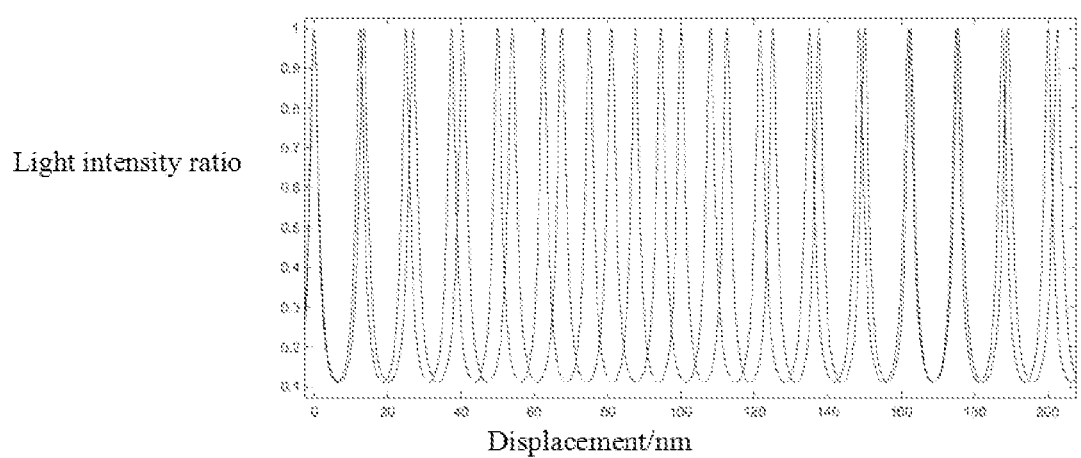
FIG. 4 is an interference peak signal diagram formed by Fabry-Perot interference at different wavelengths.

As shown in FIG. 4, according to a difference of wavelength of interference laser, interference peaks with different intervals appear with a change of Fabry-Perot cavity. If the interference wavelengths of the two Fabry-Perot cavities are very close, the interference peak intervals formed by their respective interference are also very close. For example, a difference between interference peak intervals of 633 nanometer (nm) and 632.996 nm is 1 picometer (pm). The two interference peaks with different equal intervals are used to construct the optical main ruler and the optical vernier, and the optical vernier with different resolutions are formed according to different wavelength differences.

Figure 1:
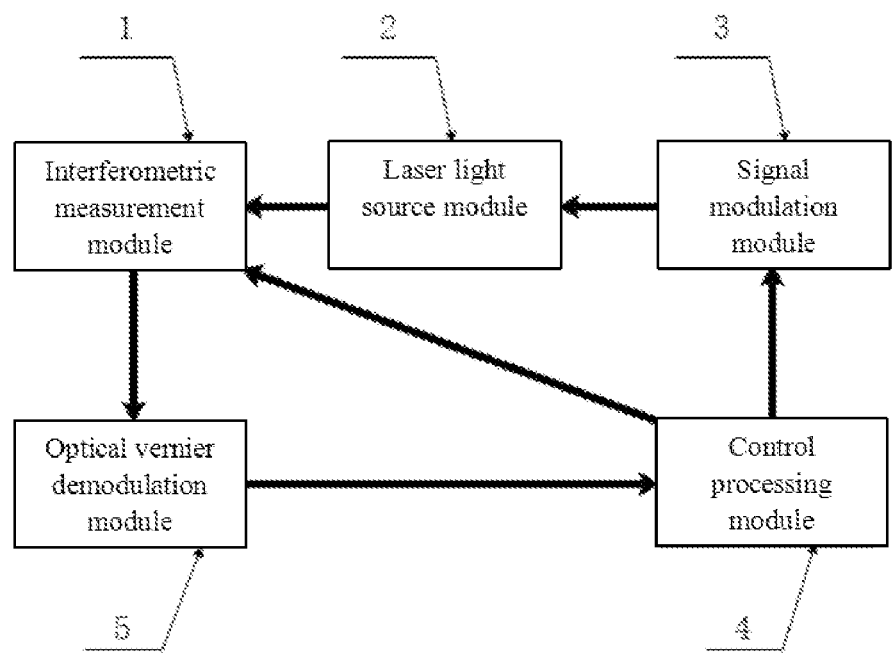
FIG. 1 is a working principle diagram of a device for measuring laser displacement according to the present application.

As shown in FIG. 1, a device for measuring laser displacement provided by the application includes an interferometric measurement module 1, a laser light source module 2, a signal modulation module 3, a control processing module 4 and an optical vernier demodulation module 5. The signal modulation module 3 modulates lasers of the laser light source module 2, so that the laser light source module 2 provides two laser beams with a fixed frequency difference to the interferometric measurement module 1. The control processing module 4 controls the interferometric measurement module 1 to perform interferometric measurement. The optical vernier demodulation module 2 demodulates interference signals obtained by the interferometric measurement module 1, and demodulation results are calculated by the control processing module 4 to obtain a measured displacement.

Figure 2:
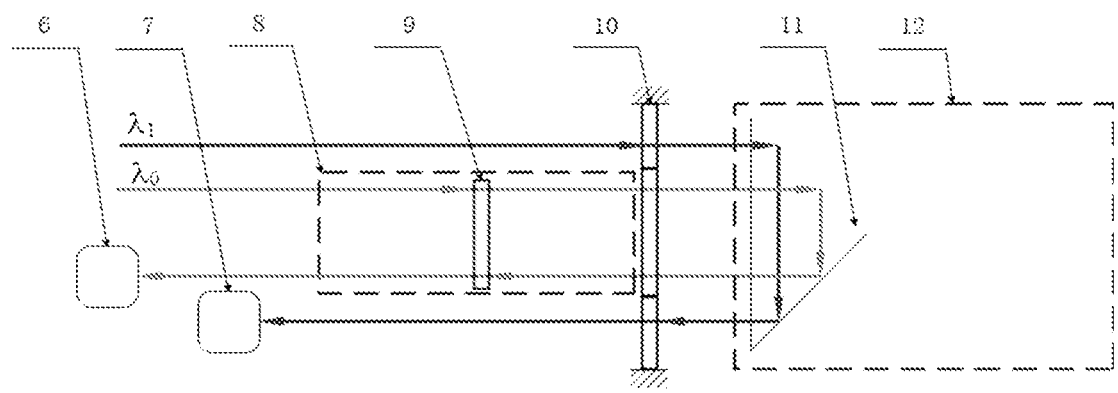
FIG. 2 is a schematic diagram of an optical principle of an interferometric measurement module according to present application.

As shown in FIG. 2, the interferometric measurement module 1 includes a first photodetector 6, a second photodetector 7, a first precision displacement stage 8, a first resonant plane mirror 9, a second resonant plane mirror 10, a first pyramid reflector 11, and a second precision displacement stage 12. The laser light source module 2 emits a main laser beam and a secondary laser beam. The main laser beam is injected into a first Fabry-Perot cavity composed of the first resonant plane mirror 9 fixed on the first precision displacement stage 8 and the first pyramid reflector 11 fixed on the second precision displacement stage 12, and interferes to form a main measurement interference beam. The main measurement interference beam is received by the first photodetector 6 to form a main measurement interference signal. The secondary laser beam is injected into a second Fabry-Perot cavity composed of the second resonant plane mirror 10 and the first pyramid reflector 11, and interferes to form a secondary measurement interference beam. The secondary measurement interference beam is received by the second photodetector 7 to form a secondary measurement interference signal.

An interferometer composed of the first precision displacement stage 8, the first resonant plane mirror 9, the first pyramid reflector 11 and the second precision displacement stage 12 is referred to as a main Fabry-Perot interferometer, and an interferometer composed of the second resonant plane mirror 10, the first pyramid reflector 11 and the second precision displacement stage 12 is referred to as a secondary Fabry-Perot interferometer. The second Fabry-Perot cavity composed of the second resonant plane mirror 10 and the first pyramid reflector 11 is a common cavity of the main Fabry-Perot interferometer and the secondary Fabry-Perot interferometer.

Therefore, two sets of interferometers are formed. By making a certain wavelength difference between the main measurement laser beam and the secondary measurement laser beam, the first pyramid reflector 11 scans back and forth to form an optical vernier. A displacement of the first resonant plane mirror 9 is accurately calculated by combining magnitude of displacement.

In an embodiment, the first resonant plane mirror is a plane mirror with first reflectivity at both ends, and the first reflectivity is 2.5%-97.6%. The second resonant plane mirror is a plane mirror with total transmission in a middle and second reflectivity at both ends, and the second reflectivity is 2.5%-97.6%.

Figure 5:
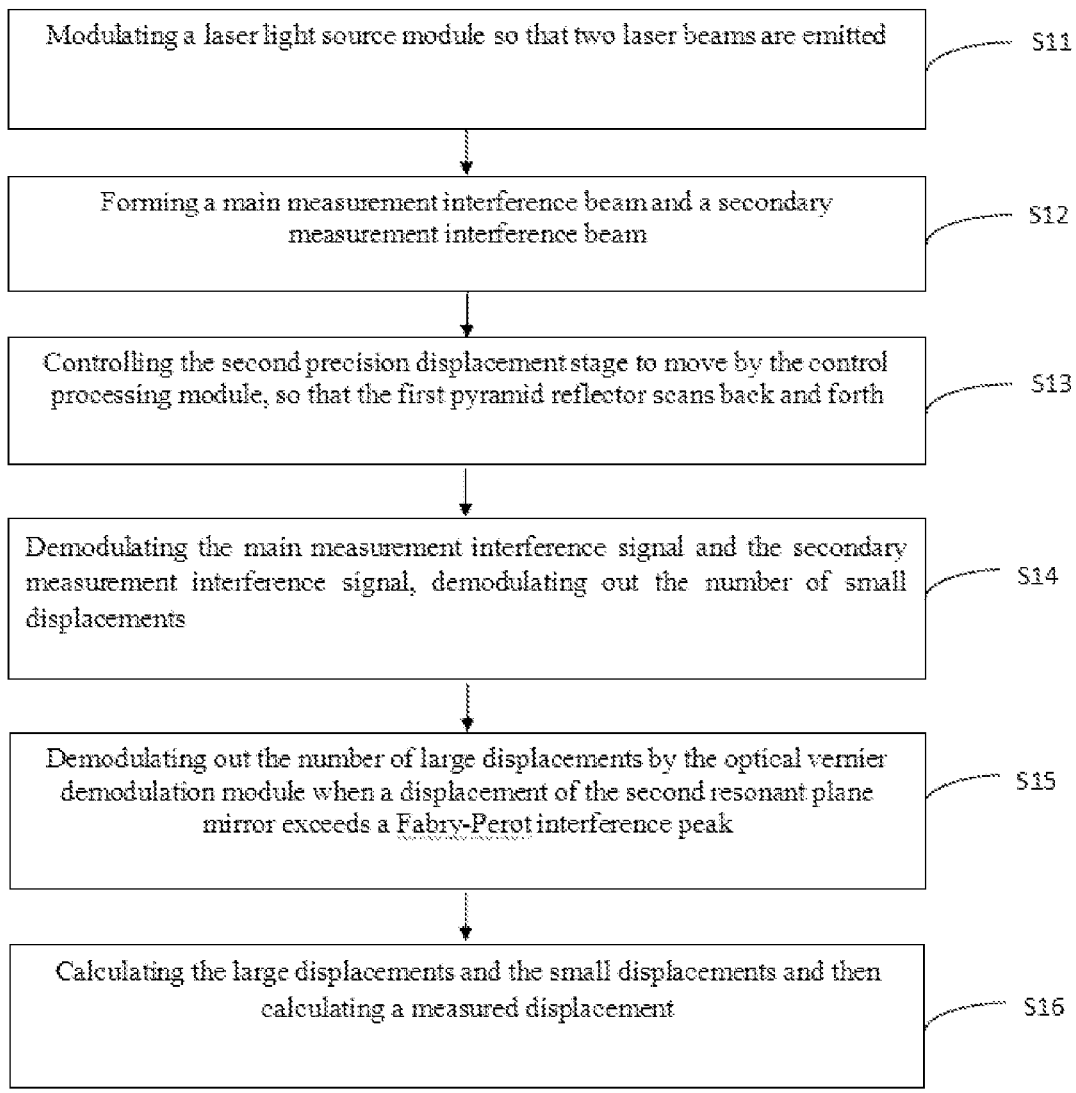
FIG. 5 is a flow chart of one method for measuring laser displacement.

As shown in FIG. 5, the application also provides a method for measuring laser displacement, and the method is implemented as follows.

S11: at the beginning of measurement, applying a light source modulation signal to the laser light source module 2 by the signal modulation module 3 controlled by the control processing module 4, so that the laser light source module 2 emits two laser beams with wavelengths of $\lambda_0$, $\lambda_1$ respectively, and the two beams are injected into the interferometric measurement module 1 for interferometric measurement;

S12: carrying out the interferometric measurement by the interferometric measurement module controlled by control processing module 4 to obtain the main measurement interference signal and the secondary measurement interference signal, where at this time, a length between two alignment positions of the optical main ruler and an optical secondary rule is:

$$l_y = \frac{\lambda_0 \lambda_1}{4(\lambda_0 - \lambda_1)}; \quad (3)$$

S13: sending the main measurement interference signal and the secondary measurement interference signal to the optical vernier demodulation module 5 at the same time, and demodulating the main measurement interference signal and the secondary measurement interference signal by the optical vernier demodulation module 5 to judge whether the main measurement interference signal and the secondary measurement interference signal reach the interference peak at the same time, where if the main measurement interference signal and the secondary measurement interference signal do not reach the interference peak at the same time, the optical vernier demodulation module 5 sends a signal that a zero point is not detected to the control processing module 4. After the control processing module 4 receives the signal that the zero point is not detected, the control processing module 4 controls the second precision displacement stage 12 in the interferometric measurement module 1 to move, and the first pyramid reflector 11 fixed on the second precision displacement stage 12 moves. At the same time, the optical vernier demodulation module 5 demodulates and judges whether the main measurement interference signal and the secondary measurement interference signal reach an interference peak point at the same time, and sends a judgment result to the control processing module. Until the judgment result is that the main measurement interference signal and the secondary measurement interference signal reach the interference peak point at the same time, the control processing module 4 controls the second precision displacement stage 12 to stop moving, and records a position $L_0$ of the second precision displacement stage 12 at this time. At this time, the main measurement interference signal and the secondary measurement interference signal formed by the interferometric measurement module 1 all reach the interference peak point, thus realizing the mechanical zero setting of the device of the application. During measurement, the control processing module 4 controls the first precision displacement stage 8 to move, so that the first resonant plane mirror 9 fixed on the first precision displacement stage 8 moves at a step value smaller than a peak interval of the main measurement interference signal. After each step stops, the control processing module 4 controls the second precision displacement stage 12 to scan one optical vernier length $l_y$ from the position $L_0$ to a moving direction of the first resonant plane mirror 9, so that the first pyramid reflector 11 scans one optical vernier length $l_y$;

S14: during the scanning process, simultaneously the main measurement interference signal and the secondary measurement interference signal to the optical vernier demodulation module 5 for demodulation judgment, and it is judged whether the main measurement interference signal and the secondary measurement interference signals reach the interference peak at the same time, where in the process of judgment, the number of interference peaks that the secondary measurement interference signal passes by is counted at the same time; in other words, small displacements are counted. When the main measurement interference signal and the secondary measurement interference signal reach the interference peak at the same time, the optical vernier demodulation module 5 sends a signal that the main measurement interference signal and the secondary measurement interference signal reach the interference peak point at the same time and a signal of interference peak number M that the secondary measurement interference signal passes by to the control processing module 4, and the control processing module 4 controls the first pyramid reflector 11 to stop scanning and return to the $L_0$ position. At the same time, the small displacements l are obtained by calculating according to formula (4):

$$l = M \times \frac{\lambda_0 - \lambda_1}{4}. \tag{2}$$

S15: recording the first resonant plane mirror 9 moves by one large displacement when the main measurement interference signal and the secondary measurement interference signal reach the interference peak point at the same time, the interference peak number that the secondary measurement interference signal passes by is smaller than the small displacements demodulated last time, and obtaining the number N of large displacements through analogy by the control processing module 4, and calculating the large displacements by formula (5):

$$L = N \times \frac{\lambda_0}{4}; \tag{3}$$

and

S16: calculating the measured displacement ΔL by the control processing module 4 according to the formula (6), and then performing a next displacement measurement:

$$\Delta L = L + l \tag{6}.$$

Embodiment 2

Figure 3:
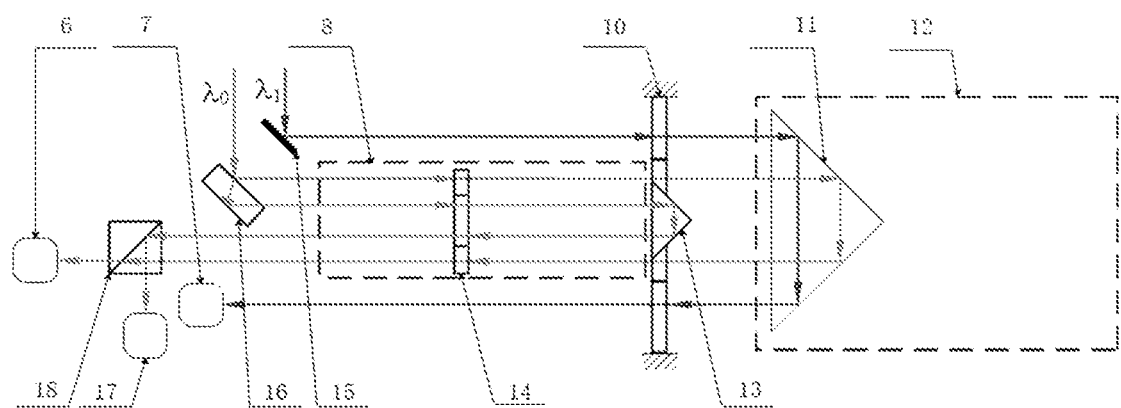
FIG. 3 is an optical schematic diagram of another structure of an interferometric measurement module according to the present application.

In this embodiment, the interferometric measurement module adopts a device of the schematic diagram 3. As shown in FIG. 3, the interferometric measurement module 1 is added with a Fabry-Perot interferometer composed of the first precision displacement stage, a third resonant plane mirror and a second pyramid reflector on the basis of the interferometric device shown in FIG. 2, and uses the second resonant plane mirror 10 to replace the first resonant plane mirror 9. Specifically, the interferometric measurement module comprises the first photodetector 6, the second photodetector 7, the first precision displacement stage 8, the second resonant plane mirror 10, the first pyramid reflector 11, the second precision displacement stage 12, the second pyramid reflector 13, the third resonant plane mirror 14, the reflector 15, the beam splitting plate 16, the third photodetector 17 and the beam splitter mirror 18. The laser light source module 2 emits the main laser beam and the secondary laser beam; the main laser beam and the secondary laser beam have fixed frequency difference. The main laser beam is divided into the first sub-main laser beam and the second sub-main laser beam by the beam splitting plate 15. The first sub-main laser beam is reflected into a first Fabry-Perot cavity composed of the third resonant plane mirror 14 fixed on the first precision displacement stage 8 and the first pyramid reflector 11 fixed on the second precision displacement stage 12, and interferes to form the first sub-main measurement interference beam. The first sub-main measurement interference beam is transmitted by the beam splitter mirror 18 and received by the first photodetector 6 to form the first sub-main measurement interference signal. The second sub-main laser beam is reflected into a second Fabry-Perot cavity composed of the third resonant plane mirror 14 and the second pyramid reflector 13 for interference to form the second sub-main measurement interference beam, the second sub-main measurement interference beam is reflected by the beam splitter mirror 18 and received by the third photodetector 17 to form the second sub-main measurement interference signal. The first sub-main measurement interference signal and the second sub-main measurement interference signal constitute the main measurement interference signal. The secondary laser beam is reflected by the reflector 15 into a third Fabry-Perot cavity composed of the second resonant plane mirror 10 and the first pyramid reflector 11, and interferes to form the secondary measurement interference beam, the secondary measurement interference beam is received by the second photodetector 7 to form the secondary measurement interference signal.

In an embodiment, the second resonant plane mirror is a plane mirror with total transmission in the middle and second reflectivity at both ends, and the second reflectivity is 2.5%-97.6%. The third resonant plane mirror is a plane mirror with third reflectivity in a middle and fourth reflectivity at both ends, where the third reflectivity is 90%-97.6% and the fourth reflectivity is 2.5%-97.6%.

Figure 6:
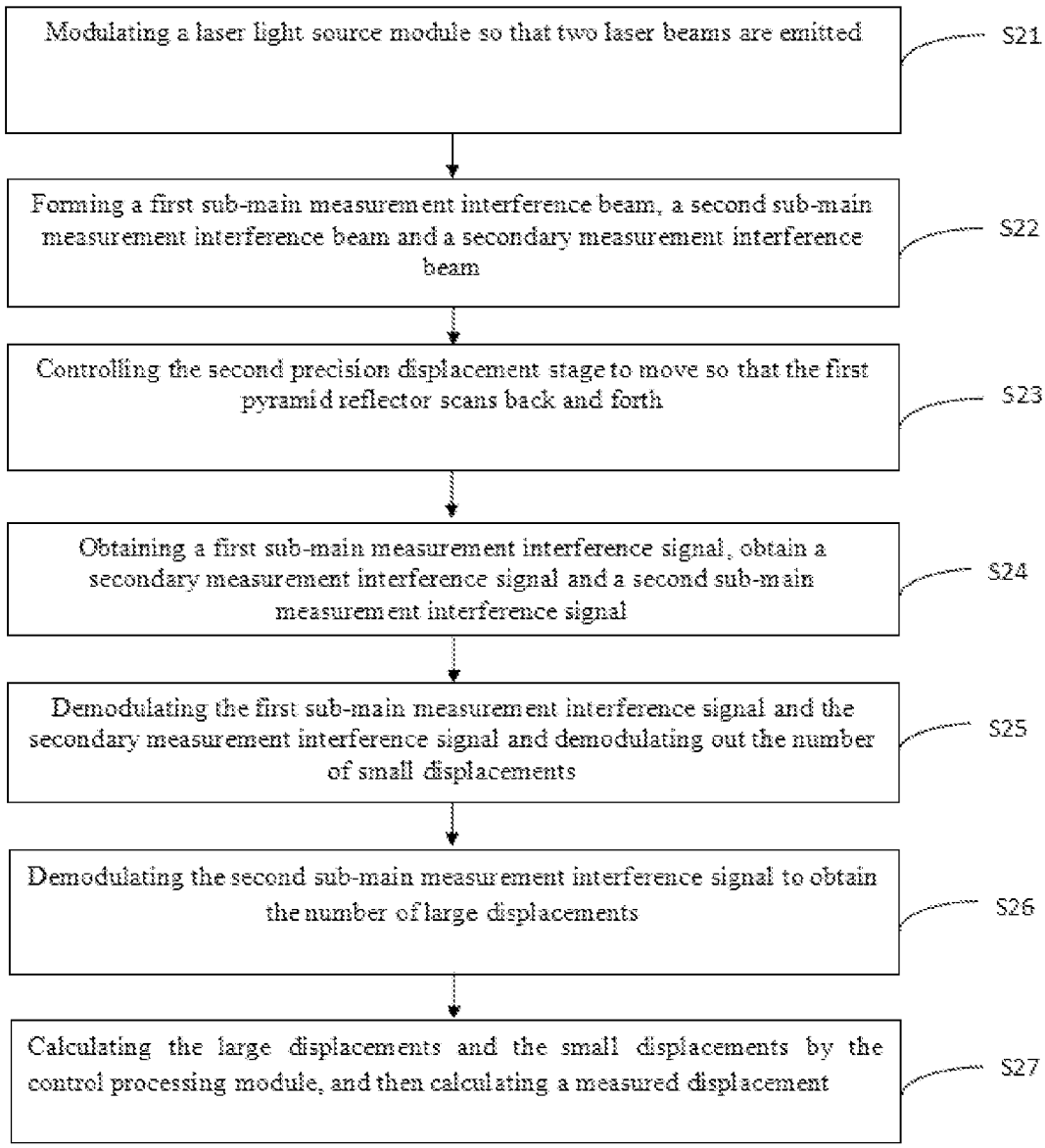
FIG. 6 is a flow chart of another method for measuring laser displacement.

As shown in FIG. 6, the application also provides a method for measuring laser displacement, and the method is implemented as follows.

S21: at the beginning of measurement, applying the light source modulation signal to the laser light source module 2 by the signal modulation module 3 controlled by the control processing module 4, so that the laser light source module 2 emits two laser beams with wavelengths of $\lambda_0$, $\lambda_1$ respectively, and the two laser beams are injected into the interferometric measurement module 1 for interferometric measurement;

S22: carrying out interferometric measurement by the interferometric measurement module 1 controlled by control processing module 4 to obtain the first sub-main measurement interference signal $I_0$, the second sub-main measurement interference signal $I_1$, and the secondary measurement interference signal $I_2$, where at $$l_y = \frac{\lambda_0 \lambda_1}{4(\lambda_0 - \lambda_1)};$$

this time, the optical vernier length is in other words, the optical vernier length is the length between the two alignment positions of the optical main ruler and the optical secondary ruler;

S23: sending the measurement interference signals $I_0$, $I_1$ and $I_2$ to the optical vernier demodulation module 5 at the same time, and demodulating the measurement interference signals $I_0$, $I_1$ and $I_2$ by the optical vernier demodulation module 5 to determine whether the measurement interference signals $I_0$ and $I_2$ reach the interference peak point at the same time, where if the measured interference signals $I_0$ and $I_2$ do not reach the interference peak point at the same time, the optical vernier demodulation module 5 sends the signal that the zero point is not detected to the control processing module 4. After the control processing module 4 receives the signal that the zero point is not detected, the control processing module 4 controls the second precision displacement stage 12 in the interferometric measurement module 1 to move, and the first pyramid reflector 11 fixed on the second precision displacement stage 12 moves. At the same time, the optical vernier demodulation module 5 demodulates and judges the measured interference signals $I_0$ and $I_2$, and judges whether they reach the interference peak point at the same time and sends judgement results to the control processing module 4. Until the judgment result is that the measured interference signals $I_0$ and $I_2$ reach the interference peak point at the same time, the control processing module 4 controls the second precision displacement stage 12 to stop moving, and records the position $L_0$ of the second precision displacement stage 12 at this time. The control processing module 4 controls the first precision displacement stage 8 to move, so that the third resonant plane mirror 14 fixed on the first precision displacement stage 8 moves; in this process, the optical vernier demodulation module 5 demodulates and judges the second sub-main measurement interference signal. When the second sub-main measurement interference signal reaches a first interference peak, the control processing module 4 controls the first precision displacement stage 8 to stop moving. The control processing module 4 controls the second precision displacement stage 12 to scan one optical vernier length from the position $L_0$ to a moving direction of the third resonant plane mirror 14, so that the first pyramid reflector 11 scans one optical vernier length $l_y$;

S24: detecting the first sub-main measurement interference beam by the first photodetector to obtain a first sub-main measurement interference signal when a displacement of the third resonant plane mirror is $\Delta L$; detecting the secondary measurement interference beam by the second photodetector to obtain a secondary measurement interference signal; detecting the second sub-main measurement interference beam by the third photodetector to obtain a second sub-main measurement interference signal;

S25: in the scanning process, demodulating the measurement interference signals $I_0$ and $I_2$, by the optical vernier demodulation module 5 to judge whether the measurement interference signals $I_0$ and $I_2$ reach the interference peak point at the same time, where in the process of judgment, the number of interference peaks passed by the secondary measurement interference signal $I_2$ is counted at the same time; in other words, the small displacements are counted. When the measurement interference signals $I_0$ and $I_2$ reach the interference peak points at the same time, the optical vernier demodulation module 5 sends the signals of the measurement interference signals $I_0$ and $I_2$ reaching the interference peak points at the same time and the signal of the interference peak number M passed by the secondary measurement interference signal $I_2$ to the control processing module 4. The control processing module 4 calculates the small displacements by formula (4), and remembers the demodulated small displacements $l_0$ at this time. The control processing module 4 controls the second precision displacement stage 12 to return to the position $L_0$. At this time, the measurement interference signals $I_0$ and $I_2$ formed by the interferometric measurement module 1 all reach the interference peak points, thus realizing the mechanical zero setting of the device of the application;

S26: during measurement, controlling the first precision displacement stage 8 to move by the control processing module 4, so that the third resonant plane mirror 14 fixed on the first precision displacement stage 8 moves, where in this process, the optical vernier demodulation module 5 counts the interference peak number N passed by the second sub-main measurement interference signal $I_1$, in other words, the large displacements are counted. After the first precision displacement stage 8 stops moving, the control processing module 4 controls the second precision displacement stage 12 to repeatedly scan one optical vernier length $l_y$ from the position $L_0$ to the moving direction of the third resonant plane mirror 14, so that the first pyramid reflector 11 scans one optical vernier length $l_y$. In the scanning process, the optical vernier demodulation module 5 demodulates and judges the measurement interference signals $I_0$ and $I_2$, and judges whether the measurement interference signals $I_0$ and $I_2$ reach the interference peak points at the same time. During the judgment process, the number of interference peaks passed by the secondary measurement interference signal $I_2$ is counted at the same time; in other words, the small displacements are counted. When the measurement interference signals $I_0$ and $I_2$ reach the interference peak points at the same time, the optical vernier demodulation module 5 sends the signal that the measurement interference signals $I_0$ and $I_2$ reach interference peak points at the same time and the signal of the number M of interference peak passed by the secondary measurement interference signal $I_2$ and the number N of interference peak passed by the second primary measurement interference signal $I_1$ to the control processing module 4, and the control processing module 4 calculates the displacement decimal number by formula (4) and calculates large displacements by formula (5);

S27: getting a final measured displacement of according to the following rules.

1. When the second sub-main measurement interference signal does not reach the first interference peak, the final measured displacement is the displacement decimal number:

$$\Delta L = l \quad (4).$$

2. When the second sub-main measurement interference signal passes by the first interference peak:

2.1. $l_0$ is not zero, which means that at a scanning starting point of the first pyramid reflector 11, the second sub-main measurement interference signal is not at the position of the interference peak. At this time:

a, displacement decimal l is greater than $l_0$:

$$\Delta L = L + l - \frac{\lambda_0}{4}. \quad (8)$$

b, when the displacement decimal l is less than $l_0$:

$$\Delta L = L + l \quad (5).$$

2.2. $l_0$ is zero, which means that at the scanning starting point of the first pyramid reflector 11, the second sub-main measurement interference signal is at the position of the interference peak. At this time:

$$\Delta L = L + l \quad (6).$$

Finally, the measured displacement $\Delta L$ is calculated, and then the next measurement is made.

In the description of the present application, it should be understood that the orientation or positional relationship indicated by the terms "longitudinal", "transverse", "upper", "lower", "front", "rear", "left", "right", "vertical", "horizontal", "top", "bottom", "inner", "outer" is based on the orientation or positional relationship shown in the figures, and is only for the convenience of describing the present application, rather than indicating or implying that the device or elements must be in designated orientation, or configured or operated in designated orientation so that they cannot be understood as the limitation of this application.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. A device for measuring laser displacement, comprising a controller, for controlling a modulator to apply a light source modulation signal to a laser light source,
the laser light source, for providing two laser beams with fixed frequency difference to an interferometric measurer;
the controller, further for controlling the interferometric measurer to perform interferometric measurement;
wherein during measurement, lasers interfere in two Fabry-Perot cavities in the interferometric measurer, and are detected by two photodetectors to form a main measurement interference signal and a secondary measurement interference signal;
an optical vernier demodulator, for demodulating the main measurement interference signal and the secondary measurement interference signal obtained by the interferometric measurer, and
the controller, further for calculating demodulation results to obtain a measured displacement.

2. The device for measuring laser displacement according to claim 1, wherein the interferometric measurer comprises a first photodetector, a second photodetector, a first precision displacement stage, a first resonant plane mirror, a second resonant plane mirror, a first pyramid reflector and a second precision displacement stage;
the laser light source emits a main laser beam and a secondary laser beam;
the main laser beam is injected into a first Fabry-Perot cavity composed of the first resonant plane mirror fixed on the first precision displacement stage and the first pyramid reflector fixed on the second precision displacement stage for interference to form a main measurement interference beam, the main measurement interference beam is received by the first photodetector to form a main measurement interference signal;
the secondary laser beam is injected into a second Fabry-Perot cavity composed of the second resonant plane mirror and the first pyramid reflector for interference to form a secondary measurement interference beam, the secondary measurement interference beam is received by a second photodetector to form a secondary measurement interference signal.

3. The device for measuring laser displacement according to claim 1, wherein the interferometric measurer comprises:
a laser light source, for emitting a main laser beam and a secondary laser beam with fixed frequency difference;
wherein the main laser beam is divided into a first sub-main laser beam and a second sub-main laser beam by the beam splitting plate;
wherein the first sub-main laser beam is reflected into a first Fabry-Perot cavity composed of a third resonant plane mirror fixed on a first precision displacement stage and a first pyramid reflector fixed on a second precision displacement stage for interference to form a first sub-main measurement interference beam;
wherein the first sub-main measurement interference beam is transmitted through a beam splitter mirror and received by a first photodetector to form a first sub-main measurement interference signal;
the second sub-main laser beam is reflected into a second Fabry-Perot cavity composed of the third resonant plane mirror and a second pyramid reflector for interference to form a second sub-main measurement interference beam;
wherein the second sub-main measurement interference beam is reflected by the beam splitter mirror and received by a third photodetector to form a second sub-main measurement interference signal;
the first sub-main measurement interference signal and the second sub-main measurement interference signal form the main measurement interference signal;
wherein the secondary laser beam is reflected into a third Fabry-Perot cavity composed of the second resonant plane mirror and the first pyramid reflector for interference to form a secondary measurement interference beam;
wherein the secondary measurement interference beam is received by a second photodetector to form the secondary measurement interference signal.

4. The device for measuring laser displacement according to claim 2, wherein the first resonant plane mirror is a plane mirror with first reflectivity at both ends, and the first reflectivity is 2.5%-97.6%; the second resonant plane mirror is a plane mirror with total transmission in a middle and second reflectivity at both ends, and the second reflectivity is 2.5%-97.6%.

5. The device for measuring laser displacement according to claim 3, wherein the second resonant plane mirror is a plane mirror with total transmission in a middle and second reflectivity at both ends, and the second reflectivity is 2.5%-97.6%; the third resonant plane mirror is a plane mirror with third reflectivity in a middle and fourth reflectivity at both ends, wherein the third reflectivity is 90%-97.6% and the fourth reflectivity is 2.5%-97.6%.

6. A method for measuring laser displacement, comprising:
S11, modulating a laser light source by a modulator, so that two laser beams with wavelengths of $\lambda$, $\lambda_0$ respectively, are emitted by the laser light source, and injected into an interferometric measurer for interferometric measurement;
S12, controlling the interferometric measurer to perform interferometric measurement by a controller; injecting lasers with wavelengths of $\lambda$, $\lambda_0$ into a main Fabry-Perot interferometer composed of a first precision displacement stage, a first resonant plane mirror, a first pyramid reflector and a second precision displacement stage, and a secondary Fabry-Perot interferometer composed of a second resonant plane mirror, the first pyramid reflector and the second precision displacement stage, respectively, for interference to form a main measurement interference beam and a secondary measurement interference beam, then receiving the main measurement interference beam and the secondary measurement interference beam by a first photodetector and a second photodetector respectively;

S13, controlling the second precision displacement stage to move by the controller, so that the first pyramid reflector scans back and forth;

S14, detecting the main measurement interference beam by the first photodetector to obtain a main measurement interference signal when a displacement of the first resonant plane mirror is ΔL; detecting the secondary measurement interference beam by the second photodetector to obtain a secondary measurement interference signal; demodulating the main measurement interference signal and the secondary measurement interference signal by an optical vernier demodulator through an optical vernier principle, demodulating out the number M of small displacements, and calculating small displacements l by the controller:

$$l = M \times \frac{\lambda - \lambda_0}{4};$$

S15, demodulating out the number N of large displacements by the optical vernier demodulator when a displacement of the second resonant plane mirror exceeds a Fabry-Perot interference peak, in other words, the second resonant plane mirror moves more than one large displacement, and calculating large displacements L by the controller:

$$L = N \times \frac{\lambda}{4};$$

and

S16, calculating the large displacements and the small displacements by the controller and then calculating a measured displacement ΔL according to the following formula, ΔL=L+l, so far, obtaining a motion displacement of the first resonant plane mirror.

7. The method for measuring laser displacement according to claim 6, wherein the first resonant plane mirror is a plane mirror with first reflectivity at both ends, and the first reflectivity is 2.5%-97.6%; the second resonant plane mirror is a plane mirror with total transmission in a middle and second reflectivity at both ends, and the second reflectivity is 2.5%-97.6%.

8. A method for measuring laser displacement, comprising:

S21, modulating a laser light source by a signal modulator, so that two laser beams with wavelengths of λ, $\lambda_0$ respectively, are emitted by the laser light source, and are injected into an interferometric measurer for interferometric measurement;

S22, controlling the interferometric measurer to perform interferometric measurement by a controller; dividing a laser with wavelength of λ into a first sub-main laser beam and a second sub-main laser beam by a beam splitting plate, and injecting the first sub-main laser beam, the second sub-main laser beam and the laser with wavelength of $\lambda_0$ respectively to a first main Fabry-Perot interferometer composed of a first precision displacement stage, a third resonant plane mirror, a first pyramid reflector and a second precision displacement stage, a second main Fabry-Perot interferometer composed of the first precision displacement stage, a third resonant plane mirror and a second pyramid reflector and a secondary Fabry-Perot interferometer composed of the second resonant plane mirror, the first pyramid reflector and the second precision displacement stage for interference to form a first sub-main measurement interference beam, a second sub-main measurement interference beam and a secondary measurement interference beam, then receiving the first sub-main measurement interference beam, the second sub-main measurement interference beam and the secondary measurement interference beam by a first photodetector, a second photodetector and a third photodetector respectively;

S23, controlling the second precision displacement stage to move by the controller, so that the first pyramid reflector scans back and forth;

S24, detecting the first sub-main measurement interference beam by the first photodetector to obtain a first sub-main measurement interference signal when a displacement of the third resonant plane mirror is ΔL; detecting the secondary measurement interference beam by the second photodetector to obtain a secondary measurement interference signal; detecting the second sub-main measurement interference beam by the third photodetector to obtain a second sub-main measurement interference signal;

S25, demodulating the first sub-main measurement interference signal and the secondary measurement interference signal by an optical vernier demodulator according to an optical vernier principle, demodulating out the number M of small displacements, and calculating small displacements l by the controller:

$$l = M \times \frac{\lambda - \lambda_0}{4};$$

S26, demodulating the second sub-main measurement interference signal to obtain the number of large displacements by the optical vernier demodulator, and calculating by the controller to obtain large displacements L:

$$L = N \times \frac{\lambda}{4};$$

and

S27, calculating the large displacements and the small displacements by the controller, and then calculating a measured displacement ΔL according to the following formula, ΔL=L+l+$l_0$ a motion displacement of the third resonant plane mirror is obtained, where $l_0$ is a difference of light intensity peak displacement between the first sub-main measurement interference signal and the second sub-main measurement interference signal when a mechanical setting is zero.

9. The method for measuring laser displacement according to claim 8, wherein the second resonant plane mirror is a plane mirror with total transmission in a middle and second reflectivity at both ends, and the second reflectivity is 2.5%-97.6%; the third resonant plane mirror is a plane mirror with third reflectivity in a middle and fourth reflectivity at both ends, wherein the third reflectivity is 90%-97.6% and the fourth reflectivity is 2.5%-97.6%.

* * * * *